United States Patent
Lalau et al.

(10) Patent No.: US 7,200,512 B2
(45) Date of Patent: Apr. 3, 2007

(54) METHOD FOR AVOIDING PEAK TEMPERATURES IN COMMUNICATION DEVICES

(75) Inventors: Richard Lalau, North Vancouver (CA); Carl Wong, Burnaby (CA)

(73) Assignee: Sierra Wireless, Inc. (CA)

( * ) Notice: Subject to any disclaimer, the term of this patent is extended or adjusted under 35 U.S.C. 154(b) by 0 days.

(21) Appl. No.: 09/788,092

(22) Filed: Feb. 16, 2001

(65) Prior Publication Data

US 2002/0116143 A1 Aug. 22, 2002

(51) Int. Cl.
*G01K 003/00* (2006.01)

(52) U.S. Cl. ...................................................... 702/130
(58) Field of Classification Search .................. 702/130
See application file for complete search history.

(56) References Cited

U.S. PATENT DOCUMENTS

| | | | |
|---|---|---|---|
| 6,169,884 B1 | | 1/2001 | Funk |
| 6,226,601 B1 | * | 5/2001 | Longaker ..................... 702/79 |
| 6,243,656 B1 | * | 6/2001 | Arai et al. .................. 702/132 |
| 6,348,873 B1 | * | 2/2002 | Wang et al. ................ 340/635 |

FOREIGN PATENT DOCUMENTS

| | | |
|---|---|---|
| EP | 0800282 A2 | 10/1997 |
| WO | WO 00/01094 | 1/2000 |
| WO | WO 00/31990 | 6/2000 |

OTHER PUBLICATIONS

STLC60134, ST Microelectronics and Alcatel Alsthom, Paris, 1998.*
Copy of International Search Report of PCT/CA02/00117.

* cited by examiner

*Primary Examiner*—Michael Nghiem
*Assistant Examiner*—Tung S Lau
(74) *Attorney, Agent, or Firm*—Thelen Reid & Priest LLP; Robert E. Krebs

(57) ABSTRACT

A method for regulating a temperature increase rate of a communication device as the communication device transmits data is provided. The communication device transmits the data to a second communication device at a rate set. The method includes monitoring the temperature of the communication device as the communication device transmits data to the second communication device. When the temperature of the communication device exceeds an acceptable temperature, the rate set of the data is throttled in order to decrease the temperature increase rate of the communication device in order to avoid a peak temperature. The communication consumes an amount of output power during a period of time as data is transmitted. The rate set of the data is throttled by either reducing the output power used or reducing the period of time used while the communication device is transmitting to the second communication device.

37 Claims, 8 Drawing Sheets

METHOD FOR AVOIDING PEAK TEMPERATURES IN COMMUNICATION DEVICES

BACKGROUND OF THE INVENTION

1. Field of The Invention

The present invention relates generally to avoiding a peak temperature of a communication device and more particularly to regulating a temperature increase rate of a communication device as the communication device transmits data.

2. Description of Related Art

Today, users reliance on wireless communication continues to steadily increase. This reliance includes the use of wireless communication with laptop computers. These laptop computers have the ability to send and receive data, such as files and other attachments, using wireless PC cards such as modems.

The cards used to send and receive data are set within an interior of the laptop computer. The orientation of the PC card within the laptop computer is such that as heat builds up in the PC card from usage, the PC card lacks an effective way to dissipate the heat. Now making reference to FIG. 1A, FIG. 1A illustrates a schematic 100 showing a relationship between elapsed time and the temperature of a laptop computer as a PC card is transmitting data. As shown with reference to a heat curve 102 which illustrates a temperature increase rate of the PC card 204, as the PC card continues to transmit data, the temperature of the PC card and the laptop computer rises asymptotically. At this point, as may be appreciated by users and those skilled in the art alike, serious damage may result to the laptop computer and the PC card. More importantly, serious injury may occur to the user due to the high temperatures of the PC card and the laptop computer as the user handles the laptop computer.

Measures taken in the past to limit the temperature increase of PC cards and laptop computers include shutting off the PC card as temperatures increase beyond a certain point. However, when the PC card was shut off and the transmission of data ceased, no warning was given to the user. This is undesirable since the user is not given an opportunity to prepare for when data will no longer be transmitted.

Another method utilized to minimize temperature increases were heat sinks as shown with respect to FIG. 1B. FIG. 1B shows a laptop computer 104 having a PC card 106 with a prior art heat sink 108. As may be seen with respect to FIG. 1B, only one portion of the PC card 106 is cooled by the heat sink 108. As those skilled in the art will appreciate, the heat sink 108 cannot effectively cool the entire PC card 106. As such, the PC card 106 and the laptop computer 104 will experience the asymptotic rise in temperature, as illustrated by the heat curve 102 shown with respect to FIG. 1A.

Furthermore, the heat sink 108 is not effective in the laptop computer 104 and the PC card 106 configuration because the heat sink 108 cannot dissipate heat through conduction forced air flow. Also, as may be seen with respect to FIG. 1B, the heat sink protrudes from the laptop computer 104. Due to the protrusion of the heat sick 108 from the laptop computer 104, the heat sink 108 is prone to damage. In addition, the heat sink may also break off from the laptop computer if a user accidently knocks the heat sink 108.

Therefore, a need exists to provide a method for limiting a temperature increase rate of a PC card and a computer as the PC card is transmitting data. The new method should minimize the increase of the temperature of the PC card and the computer such that the possibility of damage to the PC card and the computer is minimized. More importantly, the new method should minimize the possibility of injury to a user handling the computer which contains the PC card transmitting the data.

BRIEF SUMMARY OF THE INVENTION

The present invention fills the aforementioned needs by providing a method for limiting a temperature increase rate of a PC card and a computer. The new method minimizes both the possibility of damage to both the computer and the PC card and potential injury to a user handling the computer.

In one embodiment of the present invention, a method for throttling a rate set of data where the rate set for the data is determined by a temperature of a communication device is disclosed. The method comprises monitoring the temperature of the communication device as the communication device transmits the data to a second communication device. The method also includes throttling the rate set of the data when the temperature of the communication device exceeds an acceptable temperature. The rate set of the data is throttled by either reducing the amount of radiated output power during the data transmission or reducing the allowable amount of time for the data transmission.

In another embodiment of the present invention, a rate set throttler for a communication device is disclosed. The rate set throttler throttles back a rate set of data for the communication device as the communication device transmits data to a second communication device. The rate set throttler throttles back the rate set when the temperature of the communication device exceeds an acceptable limit. The rate set throttler includes a temperature monitor and a throttle. The temperature monitor monitors the temperature of the communication device as the communication device transmits the data. The throttle throttles the rate set of the data being transmitted when the temperature monitor determines that the temperature of the communication device exceeds an acceptable limit. In one embodiment, the throttle throttles the rate set by reducing the amount of power consumed by the communication device as the communication device is transmitting. In another embodiment, the throttle throttles the rate set by reducing the amount of time used by the communication device while the communication device is transmitting data.

In a further embodiment of the present invention, a method for regulating a temperature increase rate of a communication device communicating at a rate set with a second communication device is disclosed. The method comprises determining the temperature of the communication device during communication. If the temperature of the communication device exceeds an acceptable temperature, the rate set of the communication device is throttled to regulate the temperature increase rate of the communication device. The temperature increase rate of the communication device is regulated with either an output power of the communication device or an amount of time used while the communication device communicates with the second communication device.

As may be appreciated, the present invention provides a method for regulating the rate at which the temperature of a PC card and a computer using the PC card increases. The present invention monitors the temperature of a PC card such that the possibility of damage to both the PC card and the computer using the PC card is minimized. Furthermore, the possibility of injury to a user due to a peak temperature of the PC card and the computer is minimized.

BRIEF DESCRIPTION OF THE SEVERAL VIEWS OF THE DRAWING(S)

Many advantages of the present invention will be apparent to those skilled in the art with a reading of this specification in conjunction with the attached drawings, wherein like reference numerals are applied to like elements and wherein.

DETAILED DESCRIPTION OF THE INVENTION

The present invention is a method for throttling a rate set of data sent with a PC card in order to decrease a temperature increase rate of the PC card. The temperature increase rate of the PC card is decreased in order to avoid a peak temperature of the PC card. As an overview, the present invention relates to limiting the temperature increase rate of a computer and a PC card located within the computer as the PC card transmits data. As will be further discussed with reference to the accompanying Figures, the PC card is wireless and transmits data at a specific speed called a rate set. As the PC card transmits data, the temperature of both the PC card and the computer increase at a temperature increase rate. In order to limit the temperature increase of both the PC card and the computer, the present invention throttles the rate set of the data being transmitted.

The rate set refers to the rate at which data is being transmitted from the PC card to a second communication device. In accordance with one embodiment of the present invention, the rate set is either of the 14.4 kilobits/sec. class or the 9.6 kilobits/sec. class. It should also be noted that, in accordance with one embodiment of the present invention, the rate set may also be cut in half in order to decrease the rate at which data is transferred between the PC card and the second communication device.

As data is transmitted between the PC card and the second communication device at a rate set, a maximum of output power is consumed to allow the transmission of the data. As will be more fully discussed with reference to the accompanying Figures, in accordance with one embodiment, the present invention throttles the rate set by throttling the consumed power used to transmit the data. Also, as will be discussed more in depth with reference to the accompanying Figures, in accordance with another embodiment, the present invention throttles the rate set by throttling the time used to transmit the data.

Figure 2:
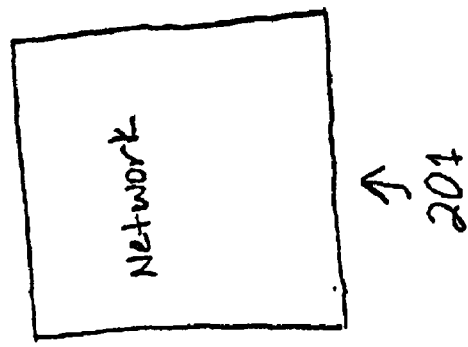
FIG. 2 illustrates a schematic of a computer having a PC card, where the computer is communicating with a network using the PC card, in accordance with one embodiment of the present invention.
Figure 2:
Figure 2:
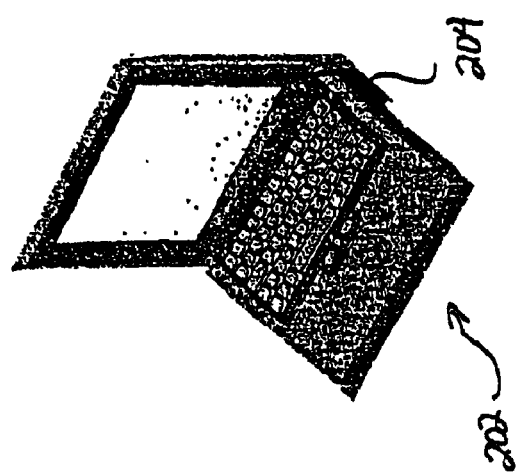

Now making reference to the Figures, and more particularly to FIG. 2, FIG. 2 illustrates a computer 202 having a PC card 204 which communicates with a network 201. The computer 202 may be any computing device which contains a processor and memory. The network 201 may be any device or system which is a major communication carrier which facilitates communication with hosts connected to the major carrier. The computer 202 wirelessly communicates as denoted by directional arrow "A" with the network 201 using the PC card 204. The PC card 204 may be any type of peripheral device which allows wireless communication, such as a wireless modem, between the computer 202 and a second communication device, such as the network 201. In one embodiment of the present invention, the PC card 204 is an AirCard™ available from Sierra Wireless located in Richmond, British Columbia, Canada. As the PC card 204 transmits data to the network 201, the rate set of the data is throttled in accordance with the temperature of the PC card 204 and the computer 202, as shown with reference to FIG. 3A.

Figure 3A:
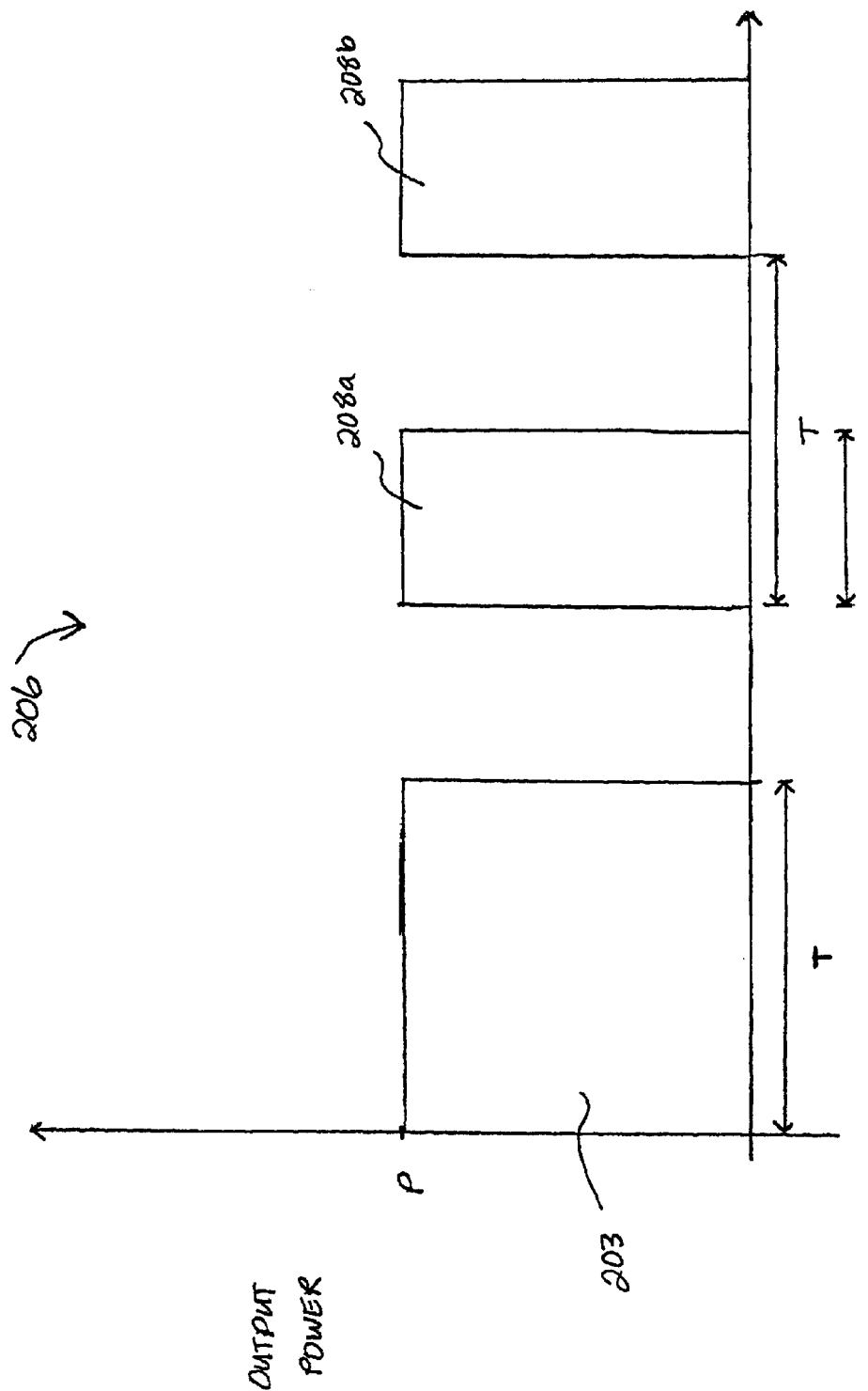
FIG. 3A illustrates a method to throttle a rate set of data being transmitted by the PC card shown with reference to FIG. 2, in accordance with one embodiment of the present invention.

FIG. 3A illustrates a method to throttle the rate set of the data being transmitted by the PC card 204, in accordance with one embodiment of the present invention. In this embodiment, the PC card 204 transmits data using half rate CDMA. The rate class for the rate set used by the PC card 204 may be any suitable rate class, such as a 14.4 kilobits/sec class or a 9.6 kilobits/sec class, as previously described.

In the method shown with respect to FIG. 3A, the amount of time used to transmit the data with the PC card 204 is throttled back. Typically, data is transmitted during a normal time interval T as shown by data transmission 203. The normal time interval T is the time necessary to transmit a half frame of data. In one embodiment of the present invention, the normal time interval T is between about 20 milliseconds to about 40 milliseconds. In addition, as the data is being transmitted, the PC card 204 typically consumes a consumed power P during the data transmission 203. In one embodiment of the present invention, the consumed power P consumed by the PC card as data is transmitted is typically between about 3 watts and about 4 watts.

As previously described, when the PC card 204 is transmitting data during the data transmission 203, using the consumed power P at time intervals T, the temperature of the PC card rises. In accordance with one embodiment of the present invention, the normal operating range of the PC card is in a range between about −45 degrees Celsius to about 70 degrees Celsius. The temperature of the PC card 204 is monitored using a temperature monitor 205, as will be discussed in further detail with respect to FIG. 5.

In order to decrease the temperature increase rate, the time interval T at which data is transmitted is throttled back by half. For example, instead of transmitting at the consumed power P and the time interval T, data is transmitted at the consumed power P for a ½T time interval as shown by data transmission 208a and 208b. Thus, during the time interval T, data is transmitted for half the time, or ½T. During the remaining ½T, the PC card 204 is not transmitting in order to decrease the temperature increase rate. At the end of the time interval T, data is again transmitted for ½T. In one embodiment of the present invention, the time interval T will be throttled to the time interval ½T when the PC card 204 reaches a temperature between about 68 degrees Celsius and about 70 degrees Celsius. It should be noted that as the temperature monitor 205 detects an increase of temperature between about 71 degrees Celsius and about 72 degrees Celsius, the time interval ½T is again throttled back by half. When the time interval ½T is throttled back a second time, the data is transmitted for a time interval ¼T. The time interval for the data transmission is continually throttled by half such that the next time interval for data transmission will be ⅛T. The time intervals will be throttled back until the PC card 204 reaches a temperature between about 75 degrees Celsius and about 76 degrees Celsius, at which point data transmission will stop until the PC card 204 sufficiently cools in order to avoid a peak temperature of about 78 degrees Celsius. In addition to throttling back the time intervals at which data is transmitted, the consumed power P used for the data transmission may also be throttled back to stem the temperature increase rate for the PC card 204, as shown with reference to FIG. 3B. It should be noted that hysterisis is applied at a switch point to a range of about 2 degrees Celsius to prevent oscillation about a rate set.

Figure 3B:
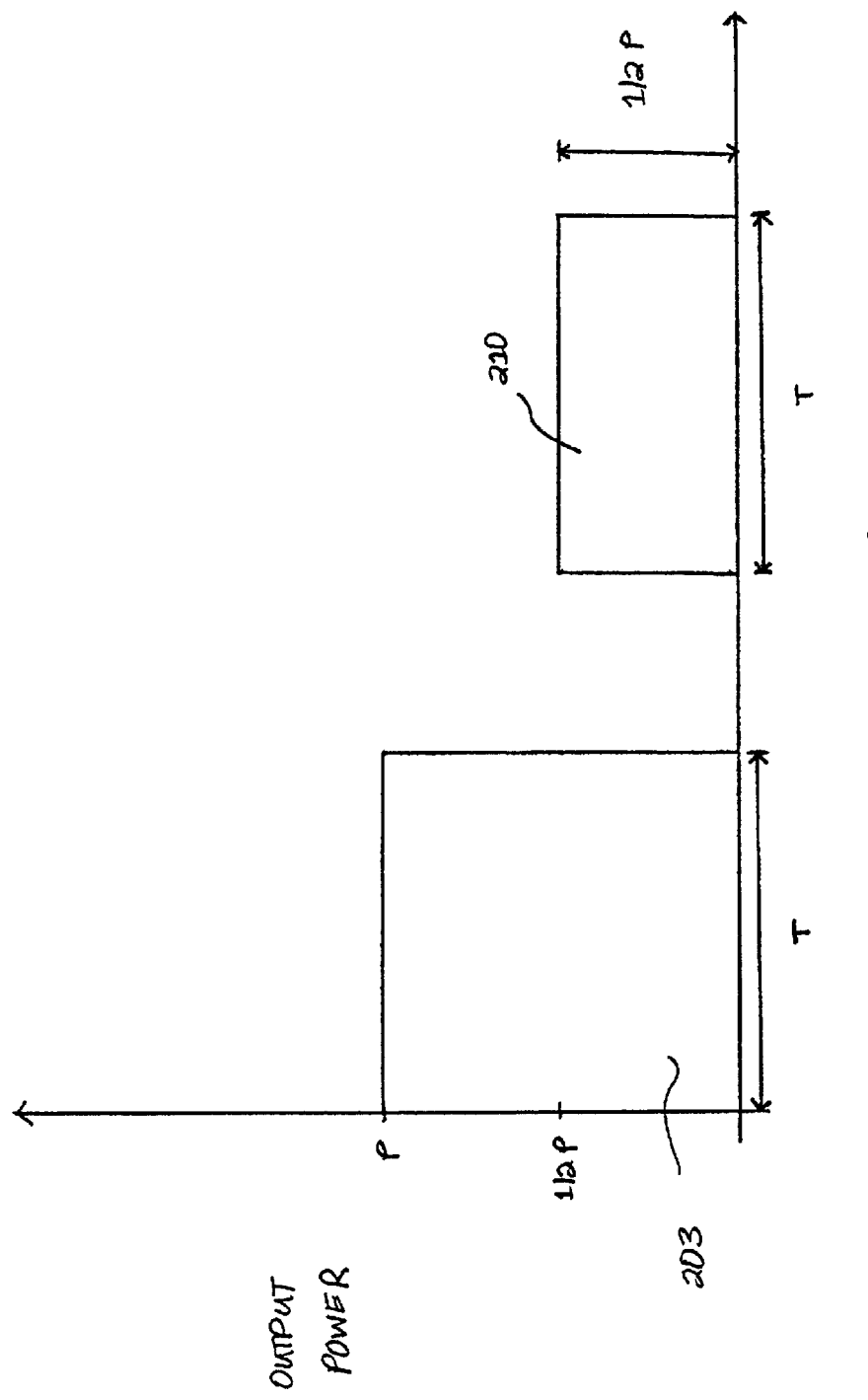
FIG. 3B shows an alternative method for throttling back a rate set of data in order to decrease the temperature increase rate of the PC card shown with reference to FIG. 2, in accordance with one embodiment of the present invention.

FIG. 3B shows an alternative method for throttling back the rate set of data in order to decrease the temperature increase rate of the PC card 204, in accordance with one embodiment of the present invention. As previously discussed, when the PC card 204 transmits data during the data transmission 203, the PC card 204 consumes a consumed power P. However, when the temperature of the PC card reaches between about 68 degrees Celsius and about 70 degrees Celsius, the consumed power P is throttled back by half, as shown by a data transmission 210. Thus, during the data transmission 210, the consumed power P is reduced to ½P, in order to decrease the temperature increase rate of the PC card 204. It should be noted that as the temperature monitor 205 detects an increase of temperature to between about 71 degrees Celsius and about 72 degrees Celsius, the consumed power P is again throttled back by half to ¼P. The consumed power P is throttled back by half when the temperature of the PC card 204 reaches between about 75 degrees Celsius and about 76 degrees Celsius, at which point data transmission is stopped until the PC card 204 cools, in order to avoid the peak temperature.

Figure 1A:
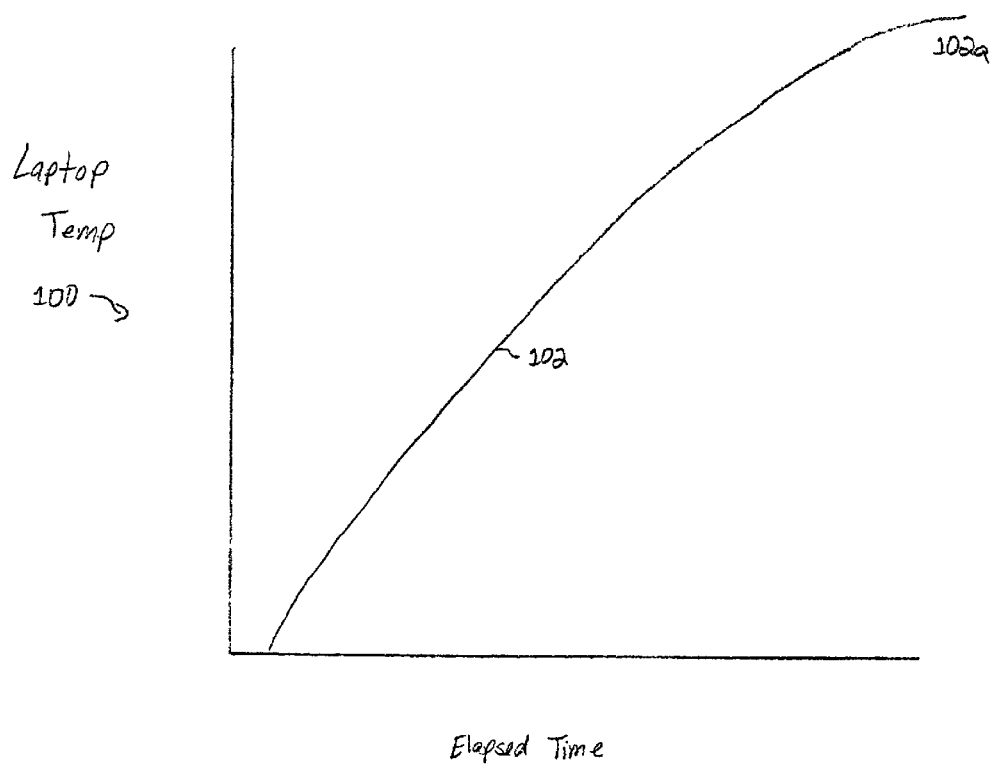
FIG. 1A is a prior art schematic 100 showing a relationship between elapsed time and a temperature of a computer as a PC card is transmitting data.
Figure 1B:
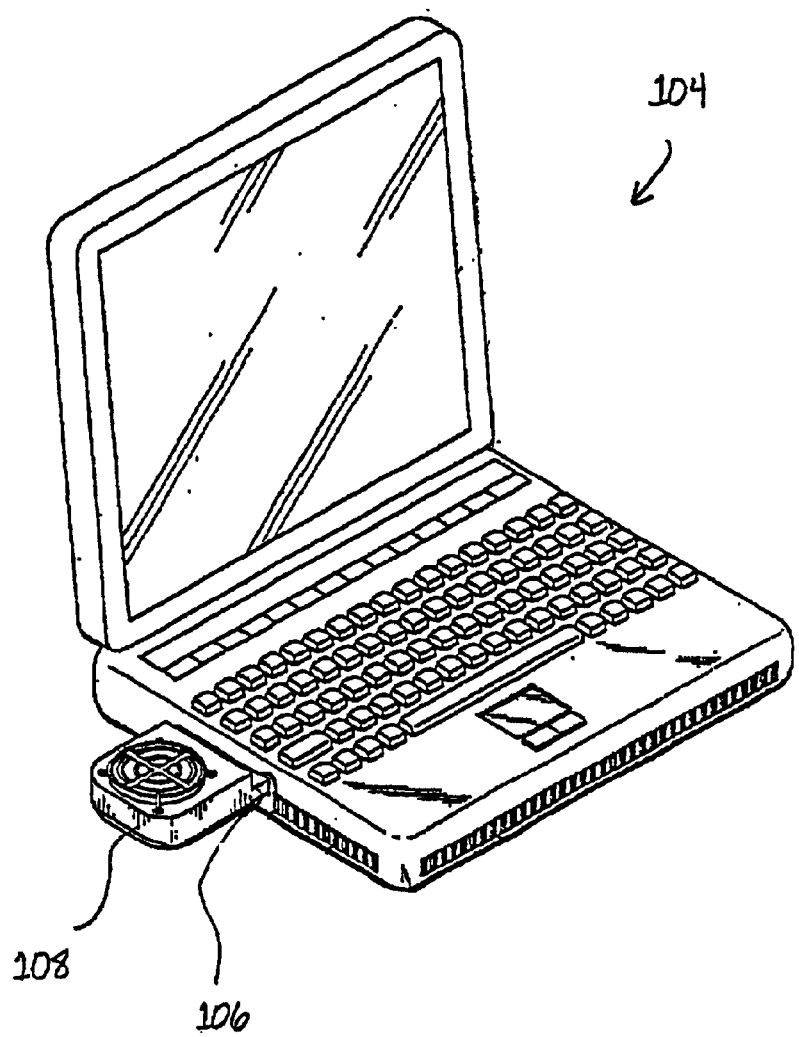
FIG. 1B shows a schematic of a computer having a PC card with a prior art heat sink.
Figure 4:
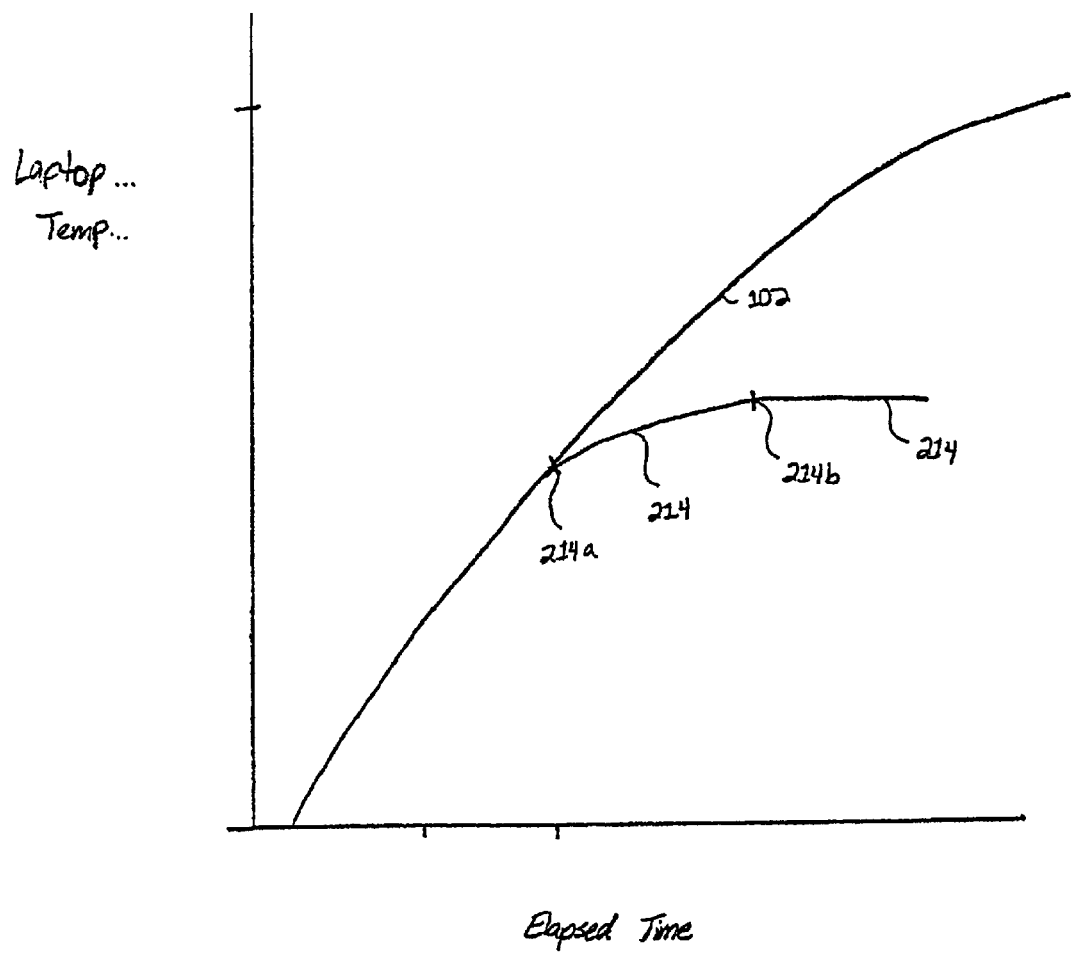
FIG. 4 illustrates a heat curve showing a temperature increase rate for the PC card shown with reference to FIG. 2, in accordance with one embodiment of The present invention.

Now making reference to FIG. 4, FIG. 4 illustrates a heat curve 214 for the temperature of the PC card 204 shown with reference to FIG. 2, in accordance with one embodiment of the present invention. Also shown with reference to FIG. 4 is the heat curve 102 discussed with reference to FIG. 1A and the prior art. It should be noted that the intersection of the laptop temperature axis and the elapsed time axis is an internal ambient laptop computer temperature, which in one embodiment, is the normal operating temperature of the laptop computer 202 shown with reference to FIG. 2. The heat curve 214 represents the temperature increase rate of the PC card 204 as the PC card 204 transmits data to the network 201. Throttle points 214a and 214b represent points where the rate set of the data transmitted to the network 201 is throttled using the previously described techniques. Thus, as the PC card 204 reaches between about 68 degrees Celsius and about 70 degrees Celsius, the data transmission is throttled back to decrease the temperature increase rate for the PC card 204, as shown by the throttle point 214a. As may seen with respect to FIG. 4, once either the output power P or the time interval T is throttled back, the rate, or slope, of the heat curve 214 decreases. The reduction of the slope of the heat curve 214 reflects a decrease of the temperature increase rate of the PC card 204. When the temperature of the PC card 204 reaches between about 71 degrees Celsius and about 72 degrees Celsius either the output power P or the time interval T is again throttled back to decrease the temperature increase rate, as shown by the throttle point 214b.

Figure 5:
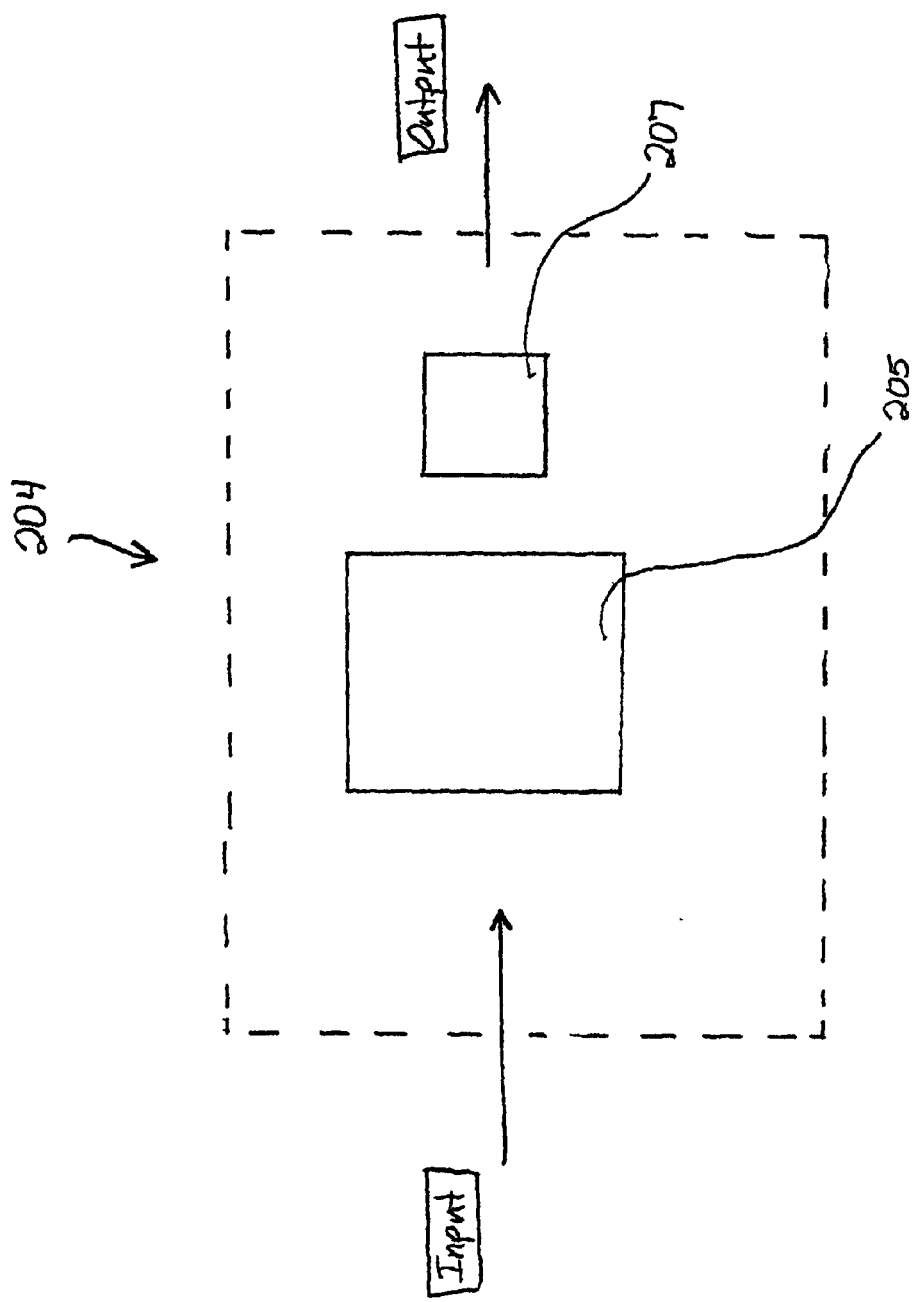
FIG. 5 illustrates a schematic of the PC card shown with respect to FIG. 2, in accordance with one embodiment of the present invention.

Now making reference to FIG. 5, FIG. 5 illustrates the PC card 204 shown with respect to FIG. 2. As shown with reference to FIG. 5, the PC card 204 takes an input and transmits an output, or data, based on the input to the network 201. In this embodiment, the PC card 204 includes a temperature monitor 205 and a throttle 207. The temperature monitor 205 monitors the temperature of the PC card 204 as the PC card 204 transmits data. The temperature monitor 205 may be any device suitable for monitoring temperatures of a PC card, such as a thermistor, a diode or the like.

The PC card 204 also includes the throttle 207. The throttle 207 regulates the rate set of the data using the previously described methods when the temperature monitor 205 detects that the PC card 204 has exceeded the aforementioned temperatures. It should be noted that in an alternative embodiment of the present invention, the throttle 207 may also regulate the rate set of the data by increasing the output power P used when the data is transmitted and increasing the time period T during which data is transmitted. As those skilled in the art will appreciate, the throttle 207 may be physically located anywhere within the computer 202 in addition to the PC card 204.

Figure 6:
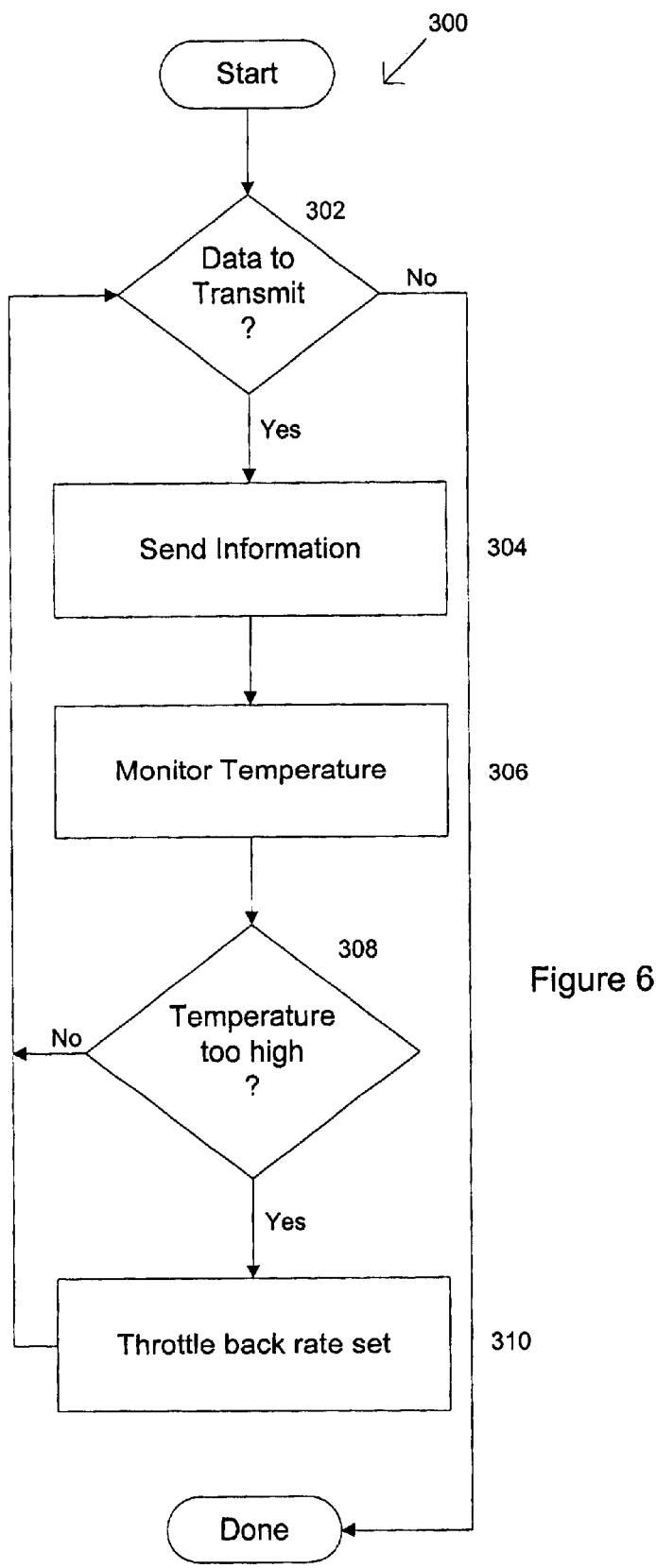
FIG. 6 illustrates a method for decreasing a temperature increase rate for the PC card shown with reference to FIG. 2, in accordance with one embodiment of the present invention.

Now making reference to FIG. 6, FIG. 6 illustrates a method 300 for decreasing the temperature increase rate for the PC card 204 shown with respect to FIG. 2, in accordance with one embodiment of the present invention. Initially, the method 300 determines if data is to be transmitted in an operation 302. If the method 300 determines that data is to be transmitted, then an operation 304 is performed. In the operation 304, the data is transmitted from a PC card to a second communication device. For example, making reference to FIG. 2, after it is determined in operation 302 that data is to be transmitted, the computer 202 transmits the data to the network 201 in the operation 304. The computer 202 transmits the data to the network 201 with the PC card 204. As the PC card 204 transmits the data, the temperature of the PC card 204 is monitored in an operation 306.

In the operation 306, a temperature monitor monitors the temperature of the PC card as the PC card transmits data to the second communication device. Turning back to the example and FIG. 5, the PC card 204 includes the temperature monitor 205. As the PC card 204 is transmitting data, the temperature monitor 205 monitors the temperature of the PC card 204. As the temperature monitor 205 monitors the temperature of the PC card 204, the temperature monitor 205 determines if the temperature of the PC card 204 is too high in an operation 308.

In the operation 308 of the method 300, the temperature monitor determines if the PC card exceeds a predetermined temperature. In one embodiment of the present invention, the predetermined temperature is between about 68 degrees Celsius and about 70 degrees Celsius. If the method 300 determines that the temperature of the PC card exceeds the predetermined temperature, the rate set is throttled back in an operation 310. As previously described, the rate set is throttled back by either throttling back the consumed power used by the PC card or the time interval used while the data is transmitted.

Turning back to the example and FIG. 3A, as the PC card 204 is transmitting data to the network 201, the temperature monitor 205 detects that the temperature of the PC card 204 has exceeded 68 degrees Celsius. As such, the time interval T used during the data transmission 203 is throttled back to the time interval ½T as indicated by the data transmission 208a, shown with respect to FIG. 3A. Therefore, as shown with respect to FIG. 4, the temperature increase rate for the PC card 204 decreases at the throttle point 214a. Once the operation 310 is complete, the operation 302 is performed again. If the method 300 determines that no further data is to be transmitted, the method 300 is complete. Turning back to the example, once the rate set is throttled back in the operation 310, the method 300 determines that no other data is available for transmission.

The present invention now allows users to send data from a wireless modem while avoiding a peak temperature which may damage the wireless modem and injure a user. When the temperature monitor determines that the PC card has reached a predetermined temperature, the rate set at which the data is being transmitted is reduced in order to decrease the temperature increase rate of the PC card. Thus, potential damage to a computer using the PC card and the PC card is minimized. More importantly, potential injury to a user from the elevated temperatures is also minimized.

The above are exemplary modes of carrying out the invention and are not intended to be limiting. It will be apparent to those of ordinary skill in the art that modifications thereto can be made without departure from the spirit and scope of the invention as set forth in the following claims.

What is claimed:

1. A method for throttling a rate sec of data, where the rate set for the data is determined by a temperature of a modem, the method comprising:

monitoring the temperature of the modem as the modem transmits the data to a second modem; and throttling the rate set of the data when the temperature of the modem exceeds an acceptable temperature.

2. A method for throttling a rate set of data as recited in claim 1, wherein the acceptable temperature is in a range from about −45 degrees Celsius to about 70 degrees Celsius.

3. A method for throttling a rate set of data as recited in claim 1, wherein the rate set is 14.4 kilobits/sec.

4. A method for throttling a rate set of data as recited in claim 1, wherein the rate set is 9.6 kilobits/sec.

5. A method for throttling a rate set of data as recited in claim 1, wherein the operation of throttling the rate set further includes:

reducing a duty cycle of the rate set by half.

6. A method for throttling a rate set of data as recited in claim 5, wherein the duty cycle is an amount of time used to transmit the data to the second modem at the rate set.

7. A method for throttling a rate set of data as recited in claim 1, wherein the operation of throttling the rate set further includes:

reducing an output power of the rate set by half.

8. A method for throttling a rate set of data as recited in claim 7, wherein the output power is an amount of power used as The modem transmits data to the second modem.

9. A method for throttling a rate set of data as recited in claim 1, wherein the modem is a wireless modem.

10. A method for throttling a rate set of data as recited in claim 9, wherein wireless communication of the wireless modem is completed using code division multiple access (CDMA).

11. A method for throttling a rate set of data as recited in claim 10, wherein the wireless communication of the wireless modem is done with time division multiple access (TDMA).

12. A method for throttling a rate set of data as recited in claim 1, the method further comprising:

maintaining continuous communication between the modem and the second modem as the rate set is throttled.

13. A method for throttling a rate set of data as recited in claim 1, wherein the temperature is monitored using a temperature monitor.

14. A method for throttling a rate set of data as recited in claim 13, wherein the temperature monitor is a thermistor.

15. A rate set throttler for a modem, where the rate set throttler throttles a rate set of data for the modem in accordance with a temperature of the modem as the modem communicates with a second modem, the rate set throttler comprising:

a temperature monitor which monitors the temperature of the modem as the modem transmits the data; and a throttle which regulates the rate set of the data being transmitted when the temperature monitor determines that the temperature of the modem exceeds an acceptable limit.

16. A rate set throttler for the modem as recited in claim 15, wherein the temperature monitor is a thermistor.

17. A rate set throttler for a modem as recited in claim 15, wherein the throttle regulates the rate set of the data by reducing a duty cycle of the rate set by half.

18. A rate set throttler for a modem as recited in claim 17, wherein the duty cycle is an amount of time used to transmit the data at the rate set to the second modem.

19. A rate set throttler for a modem as recited in claim 15, wherein the throttle regulates the rate set of the data by reducing an output power of the rate set by half.

20. A rate set throttler for a communication as recited in claim 19, wherein the output power is an amount power used as the data is being transmitted at the rate set to the second modem.

21. A rate set throttler for a modem as recited in claim 15 wherein the acceptable limit of the temperature of the modem ranges from about −45 degrees Celsius to about 70 degrees Celsius.

22. A rate set throttler for a modem as recited in claim 15, wherein the modem is a wireless modem.

23. A rate set throttler for a modem as recited in claim 15, wherein the communication between the wireless modem and the second modem is not interrupted when the throttle regulates the rate set of the data.

24. A rate set throttler for a modem as recited in claim 15, wherein the throttle decreases a temperature increase rate of the modem.

25. A method for regulating a temperature increase rate of a modem as the modem is communicating with a second modem, the modem communicating with the second modem at a rate set, the method comprising determining the temperature of the modem as the modem communicates with the second modem; and throttling the rate set of the modem if the temperature of the modem exceeds an acceptable temperature during the communication.

26. A method for regulating a temperature increase rate of a modem as recited in claim 25, wherein the acceptable temperature is in a range of about −45 degrees Celsius to about 70 degrees Celsius.

27. A method for regulating a temperature increase rate of a modem as recited in claim 25, the method further comprising:

maintaining the communication between the modem and the second modem as the rate set is throttled.

28. A method for regulating a temperature increase rate of a modem as recited in claim 25, wherein the operation of throttling the rate set further comprises:

reducing a duty cycle of the rate set by half.

29. A method for regulating a temperature increase rate of a modem as recited in claim 28, wherein the duty cycle is an amount of time used as the modem transmits data to the second modem at the rate set.

30. A method for regulating a temperature increase rate of a modem as recited in claim 29, wherein the amount of time is in a range of about 20 milliseconds to about 40 milliseconds.

31. A method for regulating a temperature increase rate of a modem as recited in claim 25, wherein the operation of throttling the rate set further comprises:

reducing an output power of the rate set by half.

32. A method for regulating a temperature increase rate of a modem as recited in claim 31, wherein the output power is an amount of power consumed as the modem transmits data to the second modem at the rate set.

33. A method for regulating a temperature increase rate of a modem as recited in claim 32, wherein the output power is in a range of about 3 watts to about 4 watts.

34. A method for regulating a temperature increase rate of a modem as recited in claim 25, wherein the modem is wireless.

35. A method for regulating a temperature increase rate of a modem as recited in claim 34 wherein wireless communication of the wireless modem is done using code division multiple access (CDMA).

36. A method for regulating a temperature increase rate of a modem as recited in claim 34, wherein wireless communication of the wireless modem is completed using time division multiple access (TDMA).

37. A method for regulating a temperature increase rate of a modem as recited in claim 25, wherein the temperature increase rate is the rate at which the temperature of the modem increases.

\* \* \* \* \*